United States Patent [19]

Hellsten

[11] Patent Number: 4,965,582
[45] Date of Patent: Oct. 23, 1990

[54] METHOD FOR RADAR MAPPING AN AREA AND A RADAR EQUIPMENT TO CARRY OUT THE METHOD

[76] Inventor: Hans O. Hellsten, Palmaers gata 6, S-582 49 Linkoping, Sweden

[21] Appl. No.: 344,952
[22] Filed: Apr. 28, 1989

Related U.S. Application Data

[63] Continuation-in-part of Ser. No. 893,294, Jul. 24, 1986, Pat. No. 4,866,446.

[30] Foreign Application Priority Data

Nov. 24, 1984 [SE] Sweden ............................... 8406007

[51] Int. Cl.$^5$ ............................................ G01S 13/90
[52] U.S. Cl. ....................................................... 342/25
[58] Field of Search ................................... 342/25, 191

[56] References Cited

U.S. PATENT DOCUMENTS

| 4,675,677 | 6/1987 | von Maydell et al. | 342/25 |
| 4,768,156 | 8/1988 | Whitehouse et al. | 342/195 |
| 4,794,395 | 12/1988 | Cindrich et al. | 342/424 |

OTHER PUBLICATIONS

Mensa et al., "Coherent Doppler Tomography for Microwave Imaging", Proceedings of the IEEE, vol. 71, Feb. 1983.

Primary Examiner—Thomas H. Tarcza
Assistant Examiner—Mark Hellner
Attorney, Agent, or Firm—Fleit, Jacobson, Cohn, Price, Holman & Stern

[57] ABSTRACT

The invention relates to a method for radar mapping an area and a radar equipment for wideband exploration at frequencies below 300 MHz. A large number of frequencies, for instance 1000, are distributed over a frequency band between for instance 12.5 and 200 MHz, and approximately corresponding to terms in a geometrical series but being different harmonics to a certain fundamental frequency. This is accomplished by a synthesis generator coupled to a phase control device and the generated frequencies are each amplified in a separate amplifier, the outputs of which are guided in groups to a number of antennas, tuned to different frequency bands and fewer than the number of frequencies. The reception is carried out in a similar way from the antennas with pre-amplifiers and a mixer each and an A/D-converter and a registration device. The equipment is meant to use the principle of so called synthetic aperture radar (SAR).

8 Claims, 6 Drawing Sheets

METHOD FOR RADAR MAPPING AN AREA AND A RADAR EQUIPMENT TO CARRY OUT THE METHOD

CROSS-REFERENCE TO RELATED APPLICATION

This is a continuation-in-part of application Ser. No. 06/893,294, filed July 24, 1986 now U.S. Pat. No. 4,866,446.

FIELD OF THE INVENTION

The invention relates to a method for radar mapping an area.

BACKGROUND OF THE INVENTION

One normally defines radar as working in the frequency interval about 220 MHz–35 GHz. The present invention, however, is intended to bring about an extremely wideband scanning at considerably lower frequencies. This is achieved, not by side bands of a carrier frequency but by using a series of discrete frequencies, distributed within the frequency band in question, which has an upper limiting frequency less than 300 MHz and the frequency band used is preferably 12.5–200 MHz.

For the invention the working name CARABAS ("Coherent All Radio Band Sensing") has been coined, which will be used in the following description of the invention.

The purpose for the invention is to bring about an exploration system, for which wavelengths of the emitted signal are equal to characteristic lengths of the structures to be classified by the system. It is thereby intended to achieve an optimal coupling between signal and structure, both in view of obtaining a good signal/-noise-ratio and of suppressing ambiguities associated with the periodicity of the radar signal.

These and other advantages and characteristics are obtained according to the invention by a method and a radar equipment having the characteristics stated in the characterizing part of claims. The equipment is then especially suitable for airborne registration and information processing according to the principle of so-called synthetic aperture radar (SAR).

According to a preferred embodiment of the invention a distribution of radio frequencies within the band in question is used, that makes the distance between two adjacent frequencies equal to a constant quotient between the frequencies, that is in geometric progression, yet approximated by using as approximated values frequencies that are exact harmonics to a certain fundamental frequency, for instance 30 kHz. To use a determined fundamental frequency makes both the generation of the frequency signals and a detection by sampling easier and also makes the problem with the coherence easier. Radar coherence is herein defined as the emitted signal being long term periodic. As by normal radar, this can be expressed such that the Fourier transform of the signal is dominated by a set of discrete spectral components, which is obtained in microwave radar with only one signal generator, that is locked to a strictly periodical mode of operation. In CARABAS the relative bandwidth is so large, that this form of signal generation is not possible. On the other hand, the absolute frequencies are so low, that digital methods of synthesis could be used.

In the receiver part of the equipment the "chain" is ended for each of the N different frequencies by a low-pass filter (Doppler-filter) which in airborne SAR-mode filters out the signals that correspond to the Doppler-shifts. These are, as is explained below, dependent upon the velocity and the resp. frequency. As both these variables are known, it is possible to dimension the filters very narrow-banded and thereby to reduce noise. If the expected Doppler-shift is 100 Hz one can for instance place a passband with a band width of 20–40 Hz centered around this frequency. To determine the amplitude and the phase, one samples with at least twice this frequency. Considering the great number of filter circuits it is suitable to sample in series, at which the following A/D-converter and data registration equipment can function according to a multiplex system.

It is previously known that it is possible with the SAR-method to produce air images, which accordingly are produced at normal radar frequencies. According to the invention, it is possible to make a corresponding reproduction also with other frequencies that are more appropriately tuned to the objects.

Reference is made to the monograph Skolnik: Introduction to radar systems, 2nd edition, McGraw-Hill 1981, for a description of known technology within the radar field. This book is hereby incorporated by reference into this description.

In certain cases, for instance when there is a risk of interference with local short-waves communication, some frequency intervals should be excluded from the band in question. This can be done either in the radar equipment itself or during the analysis of the registered signals. The activity will, however, in the latter case interfere with the communications of others. It is more proper to scan over the entire band with a special radio receiver and during the transmission exclude interfering frequencies.

SUMMARY OF THE INVENTION

The method of the present invention for radar mapping an area with a synthetic aperture radar, SAR, with suppression of speckle and including mapping structures concealed by dielectrical layers, includes a radio frequency signal, which is distributed over a large relative bandwidth. The radio frequency signal is generated in an equipment and emitted towards the area during a simultaneous movement of the equipment over the area, with the equipment being moved over the area under as constant conditions as possible with respect to height over the area, course and speed. The reflection of the emitted signal is received in the equipment. The reflectivity of the area is calculated by a tomographic method of inversion based upon the emitted signal, the received reflection and data concerning the movement of the equipment over the area, the ground reflectivity is defined as the scalar product between the direction of incidence of radiation hitting any particular point on the ground and the ground unit normal in that point, and the 2-dimensional divergence of the ground normal vector field is calculated by combining Fourier and a first order Hankel transforms of radar data, followed by a coordinate change from polar coordinates to rectangular coordinates in the frequency domain, followed by an inverse 2-dimensional Fourier transform. The 2-dimensional divergence of the ground normal vector field enables a ground topography contour map to be obtained instead of an ordinary SAR image.

In the disclosed embodiment, the underground reflexes are separated from reflexes from the ground surface by the fact that the former do not propagate along straight lines but are refracted according to Snell's law passing through the ground surface, from which fact it follows that their scattered energy becomes distributed on a semicircle in the estimated surface topography map. Whereupon, further processing is done, correlating the topography map to such semicircles of varying radii and position, whereupon further maps will be obtained focusing the scattered energy to possible subsurface phenomena as a function of position (center position of semicircle) and depth (corresponding to the radius of the semicircle). Whereby, a structural classification of objects with respect to size and depth of the location below the surface of the area is derived and a high degree of uniqueness in the relation between topographic variations of the area and radar reflectivity is obtained.

Also, in the disclosed embodiment, the signal is emitted and the reflection received by the same antenna of two wideband antennas located a certain distance from each other perpendicularly to the direction of movement. The distance being chosen equal to a characteristic wave length of the signal spectrum of the signal and the antennas are activated alternately with a period of time which is less than or at most equal to the time for moving the equipment the length of an antenna. Whereby, two separate registrations of the area are made, which are different from each other by a translation perpendicular to the direction of movement and gives the possibility to separate reflections from the right and left side of the equipment.

Further, the radio frequency signal is generated as a number of individual discrete radio frequencies or such frequencies arranged in groups. The frequencies are phaselocked to a highly stable oscillator, and the reflection of the emitted radio frequency signal from the area after the reception is demodulated by these discrete frequencies or groups of frequencies and in that the modulations obtained by the demodulation are registered with correct phase in a digital mass storage. Whereby, a coherent generation and reception of signals with a large relative bandwidth are achieved and a conflict with possible radio communication is avoided by choosing the discrete frequency spectrum in a proper way.

The discrete radio frequencies in the disclosed embodiment are chosen as those exact harmonics to a fundamental frequency, which are closest to the values in a geometrical series $f_o(1+\Delta)^n$, where $f_o$ is the lowest frequency, $\Delta$ is a measure of the frequency step and n is an ordinal number, which can take values between two chosen numbers N1 and N2, where N1 preferably is about 1000 and N2 preferably about 2000. Whereby, an unwanted coupling between the signal and spurious signals (unintentionally generated and registered side frequencies or harmonics) is avoided, the spurious signals tending to be arithmetically related to the wanted frequency spectrum.

In an alternative embodiment, the method of the present invention for radar mapping an area with a synthetic aperture radar, SAR, with suppression of speckle and including mapping of structures concealed by dielectrical layers, includes the steps of generating a radio frequency signal distributed over a large relative bandwidth in an equipment and emitting the generated radio frequency signal towards the area during a simultaneous movement of the equipment over the area. In addition, the method includes moving the equipment over the area under as constant conditions as possible with respect to height over the area, course and speed, and receiving the reflection of the emitted signal in the equipment. The method also includes calculating the reflectivity of the area by a tomographic method of inversion based upon the emitted signal, the received reflection and data concerning the movement of the equipment over the area, whereby a structural classification of objects with respect to size and depth of the location below the surface of the area can be derived and a high degree of uniqueness in the relation between topographic variations of the area and radar reflectivity can be obtained.

In a disclosed embodiment of the method, the signal is emitted and the reflection received by the same antenna of two wideband antennas located a certain distance from each other perpendicularly to the direction of movement. The distance being chosen equal to a characteristic wave length of the signal spectrum of the signal, and the antennas are activated alternately with a period of time which is less than or at most equal to the time for moving the equipment the length of an antenna. Whereby, two separate registrations of the area are made, which are different from each other by a translation perpendicular to the direction of movement and gives the possibility to separate reflections from the right and left side of the equipment.

In addition, in the disclosed embodiment, the radio frequency signal is generated as a number of individual discrete radio frequencies or such frequencies arranged in groups, which frequencies are phase-locked to a highly stagle oscillator. The reflection of the emitted radio frequency signal from the area after the reception is demodulated by these discrete frequencies or groups of frequencies and in that the modulations obtained by the demodulation are registered with correct phase in a digital mass storage. Whereby, a coherent generation and reception of signals with a large relative bandwidth are achieved and a conflict with possible radio communication is avoided by choosing the discrete frequency spectrum in a proper way.

Further, the discrete radio frequencies are chosen as those exact harmonics to a fundamental frequency, which are closest to the values in a geometrical series $f_o(1+\Delta)^n$, where $f_o$ is the lowest frequency, $\Delta$ is a measure of the frequency step and n is an ordinal number, which can take values between two chosen numbers N1 and N2, where N1 preferably is about 1000 and N2 preferably about 2000. Whereby an unwanted coupling between the signal and spurious signals (unintentionally generated and registered side frequencies or harmonics) is avoided. The spurious signals tending to be arithmetically related to the wanted frequency spectrum.

BRIEF DESCRIPTION OF THE DRAWINGS

The invention will now be explained in detail in the form of a reasoned embodiment of the invention, which is not intended to limit the invention. The various features, objects, benefits, and advantages of the present invention will become more apparent upon reading the following detailed description of the preferred embodiment(s) along with the appended claims in conjunction with the drawings, wherein like reference numerals identify corresponding components.

DETAILED DESCRIPTION OF THE PREFERRED EMBODIMENT(S)

SYSTEM DESIGN

Figure 1:
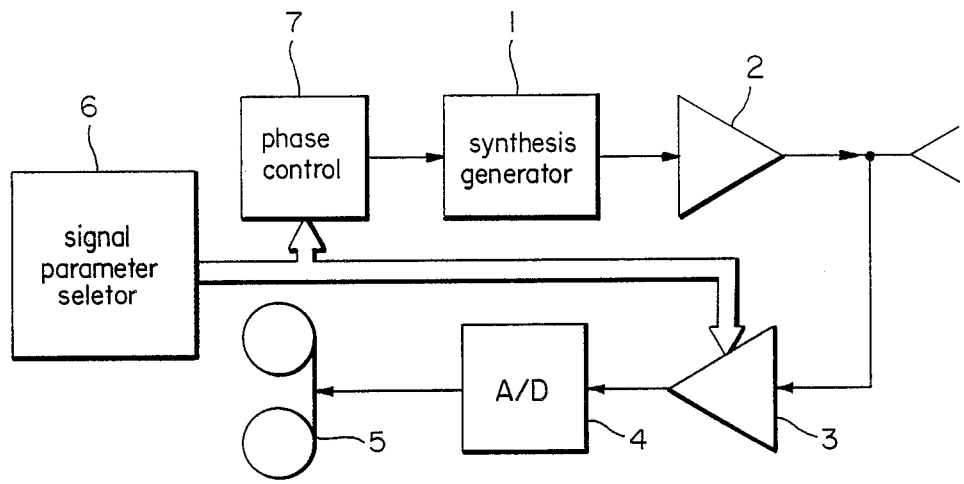
FIG. 1 shows schematically an embodiment of the present invention in the form of a block diagram.

The principal design of CARABAS in a airborne SAR-mode is illustrated in FIG. 1. The system can be looked upon as a set of peripheral units-synthesis generator 1, power amplifier 2, receiver 3, A/D-converter 4 and data tape recorder 5 - designed around a computer/data bus, called signal parameter selector 6. In addition to the trivial function of opening and closing the peripheral units before and after the measuring, the purpose of this unit is to:

Adapt the transmitted signal spectrum so that interference with local radio communication is avoided (the effective bandwidth can without major disadvantages be reduced by up to some tens of MHz.

Convert parameters describing the time dependence and frequency dependence of the signal to input data for the synthesis generator.

Close the receiver during the time the transmitted effect is essentially non-zero.

The last function has as a purpose to prevent non-linearities to occur due to the receiver being saturated. Note, however, that the return-scattered signal is different from the transmitted by its Doppler-shift and can be separated during the following data processing in anideally coherent linear system. Another such fundamental characteristic of coherent systems is the spectral difference of the return-scattered signal compared to white noise. Because of this difference, the return scattered signal can be separated from such noise present in the transmitter and receiver (this time also in practice). It follows that it is in many cases unnecessary to close the transmitter during the time the scattered signal is received. The actual coherent noise suppression in CARABAS is discussed below.

SUMMARY OF SYSTEM PARAMETERS

CARABAS can, in an example, be defined quantatively by the following set of system parameters (in the following description these parameters will be analyzed in more detail):

| | |
|---|---|
| non-ambiguity range | 5000 m |
| pulse repetions frequency | 30 kHz |
| nominal range resolution | 5 m |
| time bandwidth product | 1000 |
| synthetic aperture length | 12 km |
| coherence requirement | 0,01 Hz |
| azimuth resolution | 5 m |
| spectral interval, reflectivity | 0.75–12 m |
| spectral density, reflectivity | 3 mm/m |
| coherence noise suppression | −32 db |
| information bandwidth | 48–230 kHz |
| data speed | 0,4–2 Mbit/s |

RANGE RESOLUTION

The two factors that essentially dimensions this are the non-ambiguity range and the time bandwidth product, the latter is a measure of, among other things, the complexity of the synthesis generator. The signal which is adapted to a specific non-ambiguity range D is given by a pulse repetition frequency c/2D (where c is the velocity of light). This is in turn, the greatest common divisor or the fundamental tone for the discrete Fournier spectrum of the radar signal. An effective definition of the product of time and bandwidth is the number of harmonics which are present in it.

Assume that the transmitted signal comprises N fixed frequencies (with known complex amplitudes). In a completely static situation, without Doppler-shift, a registration with correct phase of the received signal gives N independent equations. The complex average reflectivity within N range intervals can be determined from these. Thus, the nominal resolution is D/N. In the case of CARABAS the smallest acceptable unambiguity distance would be about 5000 m, in view of the demand for surface covering capability among other things. Accordingly, the pulse repition frequency becomes 30 kHz. Further, 1000 fixed frequencies are with the present technique a realistic limit for the complexity of the synthesis generator, which gives a nominal resolution of 5 m. In any case a large number of frequencies, over 100, should be used, and even very large numbers could be used without deviating from the principle of the invention.

AZIMUTH RESOLUTION IN THE SAR-MODE

In a SAR-system, a nominal azimuth resolution can be achieved which is half the real antenna aperture. In the example, the antenna aperture is half the longest wavelength 24 m (which is consistent with the demand for a lossless antenna), so the nominal resolution becomes about 5 m. In order to maintain this resolution within the unambiguity range 5000 m an angular resolution of 1 mrad is needed. A typical aeroplane speed of 120 m/s then means that one must be able to detect radial velocities of over 12 cm/s. The Doppler-shift is twice the quotient between the radial velocity and the wavelength. For the longest wavelength, the Doppler-shift then becomes 0,01 Hz. We find that the time of integration is 100 s, under which the coherence in the synthesis generator must be maintained. The flying distance covered during this time is 12 km, which is the length of the synthetic aperture.

The demand for coherence agrees well with the performance of the CODAR-system that is mentioned in the following. In this it was established that the Doppler-shift corresponding to 5 cm/s could be detected at 25 MHz, i.e. it has been demonstrated with this system that it is possible to maintain the coherence during 100 s also in practice.

FREQUENCY DISTRIBUTION

For SAR carried by a satellite, one must consider the content of harmonics in the radar signal, so that the harmonics do not mix due to Dopper-broadening. For radio frequencies and airborne SAR, however, this broadening is less than 30 kHz, that is the smallest possible frequency separation between the harmonics, so there does not exist any principal restrictions in this case. In an embodiment of CARABAS, it is, however, also desireable that the received signal can be separated from white noise in the receiver and transmitter. To what extent such a noise suppression can be done depends on how much less the Doppler-broadening is then the actual frequency separation.

The choice of the band interval 200-12.5 MHz is a trade off between the demand for maximally multispectral information and antenna performance considerations. It is natural to locate the discrete frequencies within this interval in such a way as to approximate a geometrical series. This means that the spectral distribution of the reflectively function in CARABAS is estimated with an accuracy that depends uniformly upon the wave number. A frequency distribution of this kind is given by a progession faction n, that expresses the relative separation between the frequency components. Thus we get $$12.5 (1+n)^{1000} = 200$$

which gives n=2776 Hz/MHz. Please note that the frequency distribution is only approximately defined by this factor. The frequency components must be represented by those exact harmonics of 30 kHz which are closest to the geometrical series. Please also note that certain frequency intervals, depending upon the measuring occasion, may be excluded if there is a risk of interference with local short-wave communication. The progression factor n can be expressed in the spectral density, with which the reflectively function is estimated. For CARABAS this density is 3 mm/m.

The aeroplane speed 120 m/s means that the Doppler-broadening corresponds to speeds lower than 240 m/s. The relative Doppler-broadening thus becomes 1.6 Hz/MHz. The noise suppression for a geometrical frequency distribution can be characterized with the frequency independent ratio between the Doppler-broadening and the frequency distance. For CARABAS this ratio becomes 1.6/2776 = −32 dB.

SAMPLING FREQUENCY IN SAR-MODE

The information bandwidth for CARABAS is considerably lower than the signal bandwidth 190 MHz. Two ways of defining the information bandwidth leads to an upper and a lower limit for the sampling frequency needed. A more detailed definition of the sampling frequency needed calls for a closer analysis.

A lower limit for the sampling frequency is obviously given by the number of resolution cells which per time unit passes abeam the aeroplane. With the assumed values on azimuth resolution aeroplane speed and number of resolution cells in the range direction, the flow 24000 resolution cells/s is obtained. Each element of resolution corresponds to a unknown complex value of reflecitivily, so in order to have all these defined by measuring data, real samples have to be taken at least with the frequency 48 kHz.

An upper limit for the sampling speed is obtained from the following discussion. The Dopper-broadening corresponds to speeds lower than 240 m/s. For the lowest frequency 12.5 MHz the maximal Doppler-broadening then becomes 20 Hz. For each following higher frequency component the Dopper-broadening increases in proportion to the frequency, i.e. geometrically with the progression factor 0.002776. The maximal information bandwidth is the sum of these Dopper-bandwidths of all the 1000 frequency components. The well known formula for the sum of a geometric series gives the information bandwidth 115 kHz, which means that real samples must be taken with the frequency 230 kHz at the most The received signal is suitably stored in logarithm form after a transformation, at which 8 bits (one character) dynamics per sample should be enough. The information speed is then in the region of 0.4-2 Mbit/s. As a comparison it may be mentioned that measuring data from SEASAT were transmitted with a speed of 100 Mbit/s. The flow of resolution cells passing by SEASAT was 6 millions/ o cells/s. This transmission speed corresponds approximately to the lower limits of sampling and information velocities in CARABAS. The comparison indicates that the registration of the data hardly could become a problem. Conventional data tapes stores 1600 characters/inch. Thus band speeds between 30 and 150 inch/s are needed for the data-registration. The lower speeds are available even in the form of simple data tape recorders.

SYNTHESIS GENERATOR

The uniformly frequency divided, very broadband signal which is defined above can probably not be achieved with conventional of generation of coherent radar signals. It is, on the other hand, quite possible to generate such a signal with digital methods, which will be discussed here.

Figure 2:
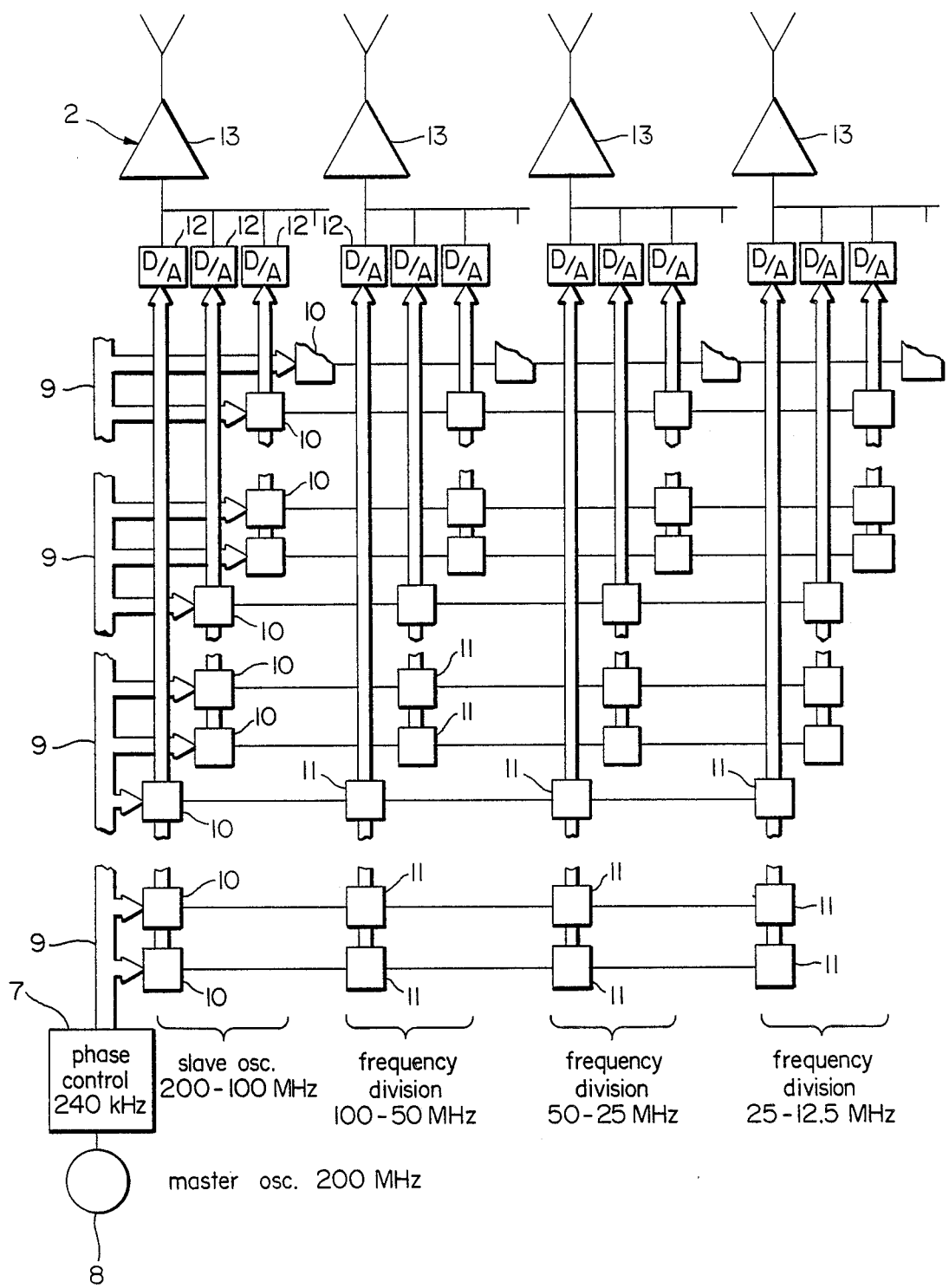
FIG. 2 shows a synthesis generator with transmission amplifiers and antennas.

The design of the synthesis generator is based on ECL-logic, with which switch frequencies up to 400 MHz are possible. An example of the principal design of the generator is given in FIG. 2. As is evident from the figure, the generator is controlled by a master oscillator 8. This controls, via a data bus 9 (called phase control bus), a number of freely oscillating flip-flops 10 (called slave oscillators). In the example, 250 such flip-flops are needed, all of which representing a harmonic to 240 kHz in the frequency interval 200-100 MHz. The digitally modulated signal produced by each flip-flop is further frequency divided by flip-flops 11 in the steps 1:2, 1:4, 1:8, at which the 1000 evenly distributed harmonics to 30 kHz are represented in the network of the generator. The outgoing signal is achieved by adding the instantaneous digital phase state in appropriate multiplets of points in the network and transform it into an analog signal. If the digital addition takes place in octets of points 125 parallelly working 8 bits D/A-converters 12 are needed. The signals from these are taken to a distributed power amplifier 2 with amplifiers 13. As all amplifiers possess a well defined, sufficiently narrow passband, digital harmonic noise can be filtered away.

It is required that the slave oscillators only drift a fraction of a period between two resets—lets say 1/10 of a period. The higher the reset frequency is, the lower the demand for frequency stability of the slave oscillator is. The frequency with which all slave flip-flops can be reset is the greatest common divisor to the natural frequency of the flip-flops, e.g. 240 kHz. It follows that the relative frequency stability of the slave flip-flops has to be about 0.0001 (1:10$^4$).

RECEIVER

Figure 3:
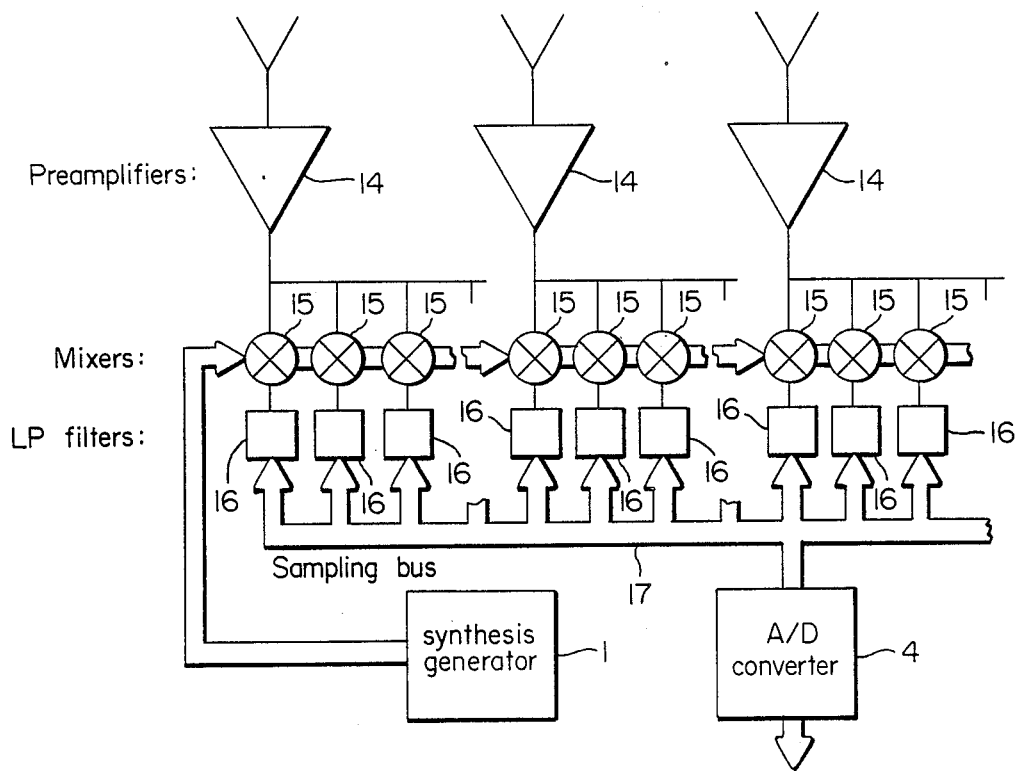
FIG. 3 shows a receiver.

The comparatively moderate data storage rate requires the receiver to be inherently narrow banded by being adapted to the expected spectrum of the return signal. This is for instance possible with a receiver design according to FIG. 3, which is almost reciprocal to the design of the transmitter. The receiver comprised a set of pre-amplifiers 14 that together covers the frequency interval 12,5-200 MHz. The signal, in this way amplified and partly frequency distributed, is then down converted in the mixer unit 15 by means of frequencies from the transmitter network. Please note that this preliminary frequency distribution must be fine enough (in other word at least four preamplifiers 14 must be used) in order to avoid problems with harmonics. The mixer products are low-pass filtered to the expected Doppler-broadening of the respective transmitted spectral component. Thus the information carrying part of the received signal is represented in the output of the 1000 low-pass filters 16 and can there be sampled with the previously deduced frequency. The sampling is controlled by a data bus 17, which, when needed, only samples a selection of outputs. This can be desirable when signals from outer sources of interference (e.g. communication radio) are found in certain outputs.

THE ANTENNA IN AIRBORNE SAR-MODE

The above reasons, based on the applications to use low frequency signals in coherent radio, have been described briefly. More reasons will be given below. A lower limit for the frequency content of the radar signal is, however, put by the dimensions of the antenna. In airborne applications this lower limit is given by the characteristic dimensions of the aeroplane. Specifically, in SAR-applications the situation is a little more complicated as the lower limiting frequency, via the dimension of the antenna, also have an effect on the azimuth resolution (as mentioned above the resolution is about $\frac{1}{4}$ of the corresponding wavelength). With microwave SAR, no attempts to try to approach this wavelength dependent limit of resolution has been done, and is probably not practical.

For CARABAS the azimuth resolution is optimized with respect to the lower limiting frequency. As will be explained, it has in the example been chosen so that the dimensions of a lossless antenna are not larger than to allow azimuth resolution just as good as with microwave SAR. The dimensions are also such that the antenna system may be carried by a small aeroplane. The azimuth resolution 5 m according to the example is achieved with an antenna aperture which is half the longest wavelength, that is 12 m.

Even if it is not quire true that the absolute bandwidth determines the nominal range resolution, the bandwidth is still an essential measure of radar performance. If, for instance, the coherent noise suppression is fixed to a certain given value, the bandwidth is directly related to the nominal range resolution. The bandwidth also determines the capability of the radar in to estimate spectral reflectivity characteristics. As for the lower frequency limit, bandwidth is limited mainly by reasons of antenna performance. The band interval 200–12,5 MHz seems to be what reasonably can be obtained with an airborne antenna system.

Figure 4:
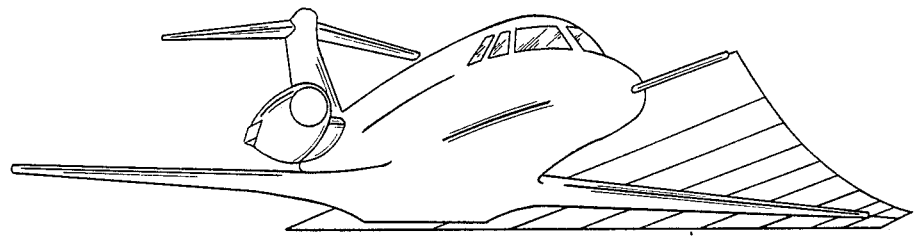
FIG. 4 shows schematically an aeroplane fitted with antennas.

The antenna directivity vertically and laterally imposes further restrictions on the antenna configuration. As the aperture distance in the example is 12 km and the unambiguity distance is 5 km, the antenna beam must have a effective lateral width greater than 90 degrees. This does not have an injurious effect on the synthetic antenna gain. It is, however, necessary to have a narrow beam in vertical direction. Above all, the forward-/backward beam ratio has to be high in order to avoid ambiguities, preferably better than 20 dB. A possible antenna configuration, both with respect to bandwidth and directivity, is a log-periodic antenna suspended from the structure of the aeroplane according to the sketch in FIG. 4. From a log-periodic antenna the radiation of a certain wavelength is emitted from the antenna element that is in the best way tuned to this wavelength. The antenna is designed so that the aeroplane structure has an influence on the antenna characteristics in a minimal way and in the same way for different wavelengths. According to the figure the lowest frequencies are emitted from elements lying under the fuselage, the intermediate frequencies along one wing and the highest frequencies from an antenna part lying outside the wing tip.

Figure 5:
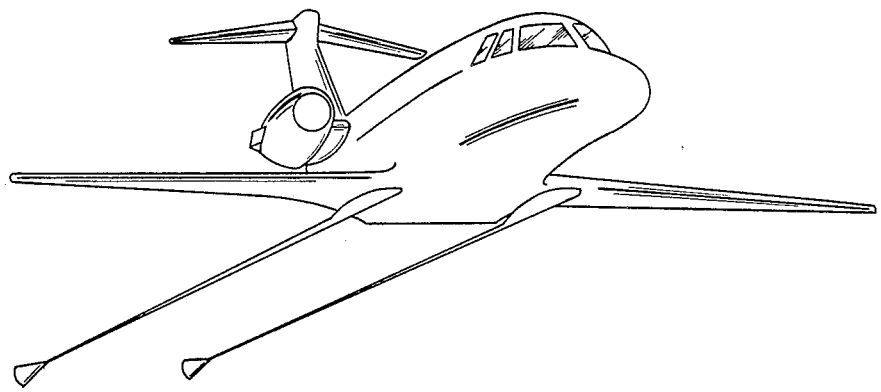
FIG. 5 shows schematically an aeroplane fitted with another type of antennas.

Another possible antenna configuration consists of two wideband antennas, for instance wideband dipoles according to the sketch in FIG. 5. The dipoles are fastened under each wing and are dragged after the aeroplane. The distance between the antennas are about 3 meters and they are about 12 meters long. The antennas are stabilized with aerodynamic cones, in the same way as fuel pipes are stabilized during air refueling of aeroplanes.

The radar pulses can be emitted and received by the same antenna, which is changed from pulse to pulse. Another way is to feed one antenna with a signal S1 and the other at the same time with a signal S2, after which the reflected signal is received by both antennas separately. During the next pulse emission, the feed to the antennas is shifted. Both of these solutions give two different registrations of the ground. Thereby, it becomes possible to separate the radar returns from the right and left side of the aeroplane, in spite of the fact that the registration from only one antenna is insufficient.

The invention differs, then, from existing radar systems by the low frequencies with which the system works, and most of all by the extremely large relative bandwidth. The large relative bandwidth makes new methods of signal processing of registered radar data necessary. Conventional SAR-image processing presupposes that the relative bandwidth is narrow. With the present large bandwidth a tomographic method of inversion for the signal processing is needed. The concept of carrier frequency has no relevance at all for such a system. The bandwidth 190 MHz according to the example means that the system gives a resolution in range that equals the non-speckle reduced resolution of the microwave-SAR (carrier frequencies over 1 GHz). The lower frequency 12.5 MHz has been chosen so that the dimensions for a lossless antenna are not larger than to make it possible to obtain a 2-dimensional resolution that is just as good as with microwave-SAR. The dimensions are also such that the antenna system can be carried by a small aeroplane with good flying economy, for instance in the way that is defined in FIG. 4.

The concept of resolution in the simple wavelength independent meaning it has been used here is of limited value. In practice, the frequency content of the emitted radiation determines to a great degree the applicability in different measuring situations for the radar. For CARABAS, the absolute bandwidth is kept, while the frequencies are about one hundred times lower than for microwave radar. The most important reasons for using these low frequencies will now be stated in more detail.

CARABAS—TECHNICAL/SCIENTIFIC MOTIVATION

CARABAS is characterized in that the wavelength of the emitted signal is equal to characteristic lengths of the structures the system shall classify. This means an optimal coupling between signal and structure both with respect to (in a broad sense) the signal/noise ratio and the suppression of ambiguities associated with the periodicity of the radar signal. Due to the extremely large relative bandwidth in CARABAS this optimal coupling can be maintained for structures and measuring objects that differ greatly from each other. The consequences of this system philosophy will now be discussed in more detail with respect to:

speckle and information in radar images,
mapping of subterrestrial structures,
classification of sea-states.

Speckle appears during radar imaging with monochromatic or coherent signals. For each discrete frequency component in such a signal, the stochastic variations in the complex reflectivity are totally random from image pixel to image pixel, if the roughness on the average exceeds half a wavelength. For a coherent signal the radar returns are the sum of the returns for each discrete frequency component. For each pixel, this sum is then given from a set of stochastically oriented vectors in the plane of complex numbers. In the case where the roughness exceeds half a wavelength within the entire bandwidth, the phase of the resulting vector varies completely randomly over the image. The speckle is then said to be fully developed. In this case, the image can only be modulated by the envelope of the stochastic fluctuations in the modulus of the return.

In the case of not fully developed speckle, there are two information carrying quantities (modulus and phase) distributed over the image. As the information content of the return signal in this way increases, the speckle-noise can be considerably reduced with the help of the continuity which a defined phase walk between the pixels means.

It follows from what has been said that the radar images of the natural ground obtained with microwaves hardly can be obtained in another way than as speckle envelopes. This means for instance that the practical linear resolution in the SAR system is several times lower than the size of the individual image element. On the other hand according to the invention the non-ambiguity distance for the fine-scale topography is 12 m (half the wavelength for 12.5 MHz), which in most cases is less than the roughness Within each image element for natural ground. Consequently, the radar image can be phase-modulated with this system, with the increase of the significance of each independent pixel this method means.

The emitted radar signal is in principle returned by every discontinuity in the dielectrical properties of the space. Thus, it is possible to receive reflexes also from discontinuities lying beneath the ground, in addition to those from the firm ground contour. The circumstances under which this is possible are essentially due to the properties of the ground as measured by the wavelength of the emitted radar signal. More precisely:

A. For subterrestrial structures to significantly contribute to the radar return it is necessary that the surface itself contributes relatively little. From this follows that the ground surface within each pixel has to be essentially plane compared with the wavelength.

B. The radar radiation penetrates the ground to a depth between a fraction of a wavelength and a few wavelengths. Only under extremely dry ground conditions an essentially greater penetration depth can be obtained.

Whereas A and B give the extreme restrictions of the applicability of the microwave radar for subterrestrial observations, this is not the case for observations made with, a radar system based upon meter waves. On the one hand, the demand for plane ground is almost always met. On the other, B means that even for normally moist ground one can expect an effective penetration of about several meters within the radio frequency spectrum.

It has also according to previously known technique been practically possible to design a so called georadar to be used under the ground surface. In Sweden such systems are used by the Institution for Technical Geology in Lund and by Swedish Geological Company (SGAB) in Uppsala. Both systems are of a incoherent pulse type. SGAB works in the frequency interval 10–50 MHz and has a range in bed-rock up to 100 m. That coherent technique, and especially SAR, can be used in high resolution reproduction of subterrestrial structures and was verified by the Space Shuttle experiment SIR-A over the Sahara desert. The desert environment fulfills the extreme demands of dryness and evenness that is necessary in order to use microwaves in this connection. There is every reason to expect that a radiofrequency SAR-system according to the invention can be used for underground exploration under much more general environmental conditions.

Oceanography is one of the most promising applications of radar technique in remote sensing. The coupling between the kinematics of the sea surface and radar reflectivity is suitably analyzed spectrally. As a simple, but very coarse approximation, the reflectivity for a certain given discrete frequency component of the emitted radar signal is proportional to the spectral component of the sea surface with twice the corresponding wave number. By illumination of the sea surface with centimeter waves, the return depends, for instance, upon the capillary wave structure of the sea surface. As a correction to this so called Bragg-scattering, also non-linear coupling terms appears, which depends both upon the presence of capillary waves and large scale wave phenomena. The exact mechanisms behind these couplings are complex and hard to master, which is well known from an extensive literature. Yet it is due to these, that it is possible at all to observe gravitational waves of not nearly-capillary wave nature with microwave radar. Among others D. Gjessing of NTNF in Norway has used coherent microwave methods to classify sea-states and used the Doppler-shift together with dispersion relations to increase the spectral resolution in the measuring. In the same way sea-states create (mainly due to large-scale variations in the capillary wave pattern) an intermodulation in the reproduction of the sea surface with microwave-SAR, which is very evident in the images registered by SEASAT (the first SAR equipped satellite).

Due to the compliated coupling between the large-scale surface phenomena and microwaves, it is only possible to obtain a very qualitative descriptions of sea-states with these. The scattering of radio frequency electromagnetic waves is a more stable basis for quantitive measurements. Bragg-scattering from gravitational waves of radio frequent radiation has been used by D. Barrick in the CODAR-system. This system measures the Doppler-shift at a discrete frequency (25 MHz) in two antenna positions. Starting from the dispersion relation for free gravitational waves the system can by that map the sea currents.

According to the above principles, the signal is returned according to the invention by Bragg-scattering of the sea wave spectrum within the wavelength interval 0.75–12 m. Longer wavelength effect the return through non-linear couplings, in the same wave as in microwave radar (yet with the difference that these couplings do not involve the unstable and short-lived capillary waves). The above mentioned dispersion relation can be used to separate returns from different parts of the 2-dimensional sea-wave spectrum in the received 1-dimensional signal spectrum. It is therefore natural to expect that large parts of the total sea movements can be mapped by means of CARABAS in a much more precise way than is the case with microwave SAR.

The following enumeration underlines the potential capacity of the invention to give multilayer information. The invention can from only one measurement give information about the vegitation canopy, as well as the earth-layer and the bed-rock. This is possible due to the large relative bandwidth, within which the different spectral components have completely different penetration and scattering properties. Thus, multilayer information is obtained (at the cost of reduce nominal resolution in each layer) by filtering the received signal with suitable passbands in the subsequent processing.

ICE MAPPING

Classifying ice with respect to age, thickness and surface structure. Analysis of fractures in the ice through the phase-anomalies in the reflectivity function associated with these. Discovery of small deep lying icebergs (growlers) through the difference in reflectivity of the radiation for ice and water. Sea clutter can then be suppressed through spectral subtraction of dispersion relations for sea-waves.

TOPOGRAPHIC MAPPING

For the same reasons that make the invention especially suitable for exploration of subterrestrial structures, the system makes it possible to explore and determine the firm ground contour in forested areas. This makes for instance, topographic mapping possible in areas where the vegetation is too extensive for photogrammetrical methods to be usable.

ECONOMIC MAPPING

Due to the penetration of the radio frequent radiation into the vegetation and ground layers, the radar return according to the invention becomes dependent upon the intrinsic dielectrical conditions in these layers. The invention can therefore be used (with varying degree of precision and unambiguity) to estimate the environmental parameters that are characteristic for these layers. Parameters that primarily can be estimated concerns to moistness above and below the ground, and the biochemical composition of the ground-layer and vegetation canopy.

GEOLOGIC MAPPING

The reproduction of the surface structure of the bedrock, by the penetration of the radiation below vegetational and soft earth layers. This type of registration is according to the invention made in an airborne SAR-mode. In order to get a maximal penetration, it is possible to use an antenna applied on or below the ground surface. In this way the inner structure of the bed-rock rock can be reproduced 2-dimensionally by SAR-technique based upon the movement of a dipol antenna along a bore hole. Based upon the experiences of SGAB ranges of up to 100 m can be expected. The invention can therefore be used in ore-prospecting.

COAST SURVEILLANCE

The wavelengths that are used according to the invention lie in an interval that makes classification of ships possible through the phase relations between dominant partial reflectors (masts, bridges etc.). These reflectors have a size small enough for the scattering of the radio frequent radiation from each of them to be almost isotropical. On the other side, the distance between them exceeds the smallest range of resolution in the example according to the invention. It follows that a certain type of ship can be given an essentially unique signature in terms of phase relations between the resolution cells of the ship in the radar image. As the system works coherently it is also possible to get further signatures by a Doppler analysis of the characteristics of the ship in motion. Finally, spectral subtraction makes a reduction of sea clutter possible.

MILITARY APPLICATIONS

A number of such are conceivable as a direct consequence of the capacity of the radio frequent radiation to penetrate into the vegetation and ground. As an example, the reconnaissance after and classification of objects under natural or artificial masks, for instance vehicles and weapon formations under cover of woods, masked staff places, underground installations certain mined areas etc. One should especially pay attention to the possibility to get resonant coupling between the radar signal and the specific metal structures for these objects (having a characteristic length of 0.75–12 m). For staff places, for instance, resonant coupling can occur to antennas for communication radio and also to electrical cables, tent-ropes etc. For underground structures the coupling cap occur to for instance reinforcements. The list could be continued.

The above presented description of the radar equipment shows the different functional units designed as discrete units. A person skilled in the art of electronics realizes that, although such a design is possible, it is advantageous to design the equipment with integrated circuits. Thus the synthesis generator shown in FIG. 2 can preferably be designed on the basis of one or a small number of integrated circuits comprising flip-flops and oscillators and D/A-converters. As such integrated circuits with the technique of today can be obtained custom-designed from a number of different manufactures, there is no reason to further discuss their design in detail.

SURFACE TOPOGRAPH PROCEDURE

The procedure for obtaining a detailed estimate of the ground surface topography, as well as of obtaining 3-D images of the ground underneath the surface, includes the following sequence of steps.

Figure 6:
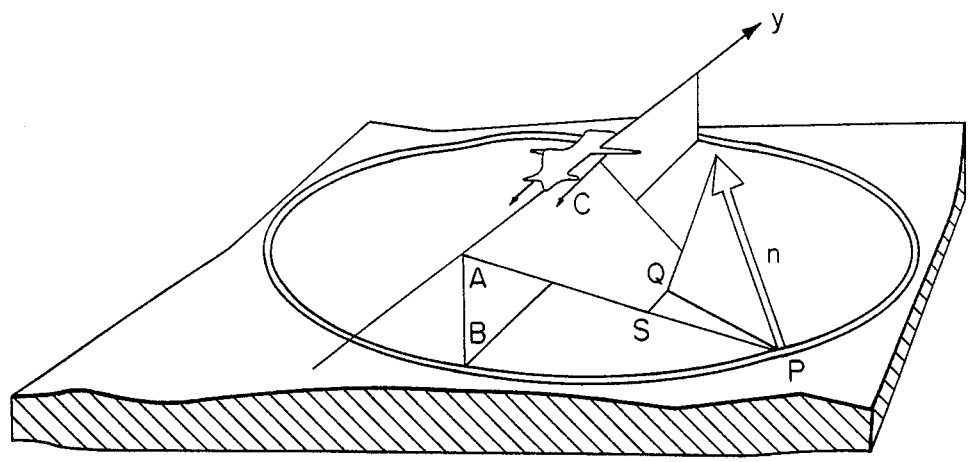
FIGS. 6, 7 and 8 show schematically the relationship of an aeroplane with the ground.

Step 1; Referring to FIG. 6, assume the ground to be a differentiable surface, which is reasonable because the radar measurement is bandlimited—a condition much stronger than differentiability. Assuming ground to be dielectrically homogeneous, the ground back-scattering reflectivity density will be dependent on the ground surface shape only. We demand that the interaction process is local to the lowest order, which excludes multiple reflection and indeed reduces it to an expression in the first order derivatives of the ground surface.

The corresponding scattering density may be derived from physical optics. It will, characteristically, be linear in m·n — m being the direction of incidence of radiation hitting a particular point on the ground and the ground unit normal in that point.

For the representation of the ground surface, a cylinder coordinate system is chosen. According to FIG. 6, the SAR azimuth axis y, along which the airplane position is labeled y=t, equals the cylinder coordinate axis. AP stands for cylinder radius, while CP spherical radius i.e. radar range and 1y−t1=AC. $\phi$=BAP is the cylinder or equivalently spherical coordinate azimuth angle (NOT THE SAR AZIMUTH ANGLE!). We shall refer to it as elevation angle. The SAR azimuth angle equals rather $\theta$=APC, less ambiguously referred to as aspect angle.

Figure 9:
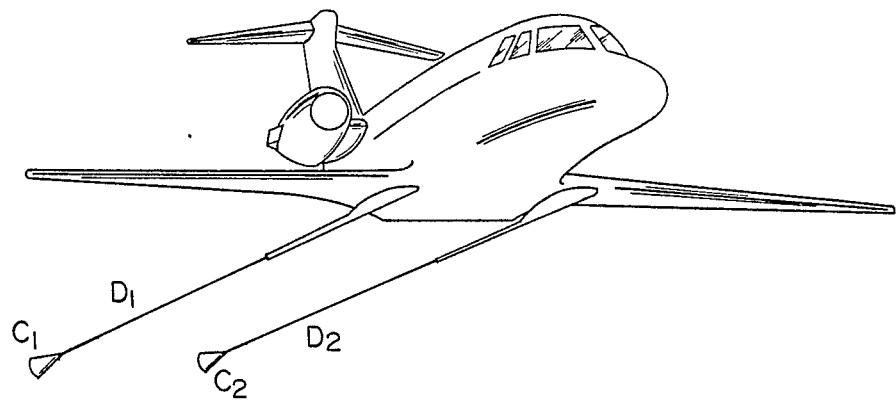
FIG. 9 shows schematically an aeroplane fitted with antennas.

It is impossible on the basis on the SAR principle alone to discriminate between ground reflexes from the right and left hand sides of the aircraft. For microwave SAR this does not cause any problem because antennas may be designed to radiate to one side of the aircraft only. At the low frequencies presently intended, because the resulting ambiguity is genuinely two-fold, a remedy is to adopt an interferometric technique for its solution. The antenna system may for instance consist of two dipoles, unsymmetrically located but copies of each other with respect to right/left mirroring, as is shown in FIG. 9. Each dipole operates independently as a monostotic radar. Time and frequency dependent reflectivity data $\Gamma_1(\nu,t)$, collected from one dipole will define the positive frequency part of a function $\Gamma$, i.e. $\Gamma(\nu,t)=\Gamma_1(\nu,t)$. Corresponding data $\Gamma_2(\nu,t)$, from the other antenna will define, by complex conjugation, the negative frequency part of the same function $\Gamma$, i.e. $\Gamma(-\nu,t)=\Gamma_2(\nu,t)^*$ (where $\nu>0$).

Ground regions at either side of the aircraft are defined by some common elevation angle span but opposite signs for cylinder range. Consider ground regions for which the elevation angle span is reasonably small (say $\leq \phi \leq \pi/4$). Since the displacement of the dipoles off the cylinder axis is small, the axial symmetry of the radiation distribution pattern of each dipole will remain inside such a span. The antenna system "transfer" function $\psi$, apart from frequency $\nu$ (positive or negative corresponding to each of the two antennas) may thus be assumed dependent on the aspect angle $\theta$ but independent of the elevation angle $\phi$·. Letting stand for proportionality, radar data is assumed related to the ground topography by the integral expression.

$$\Gamma(\nu,t) \propto e^{i\nu t} \int_0^\infty dR \int_{-\pi}^{\pi} d\theta e^{i2\nu R/c} \frac{n \cdot m}{R} \Psi(\nu,\theta) \quad (1)$$

defined for both positive and negative frequencies. It may be demonstrated that the ground reflectivity factor (n·m)/R equals the Jacobian $$\frac{d\Omega}{dRd\theta}$$

where $d\Omega$ denotes solid angle. If ground undulations are not too rough, $RdRd\theta$ equals the intrinsic surface measure of the ground. In this limit, (1) is equivalent to the Kirchhoff approximation, adopted in e.g. Lewis R. M. [1969]: "PHYSICAL OPTICS INVERSE DIFFRACTION" IEEE Trans.Ant.Prop.AP.17,No. 3.

Figure 7:
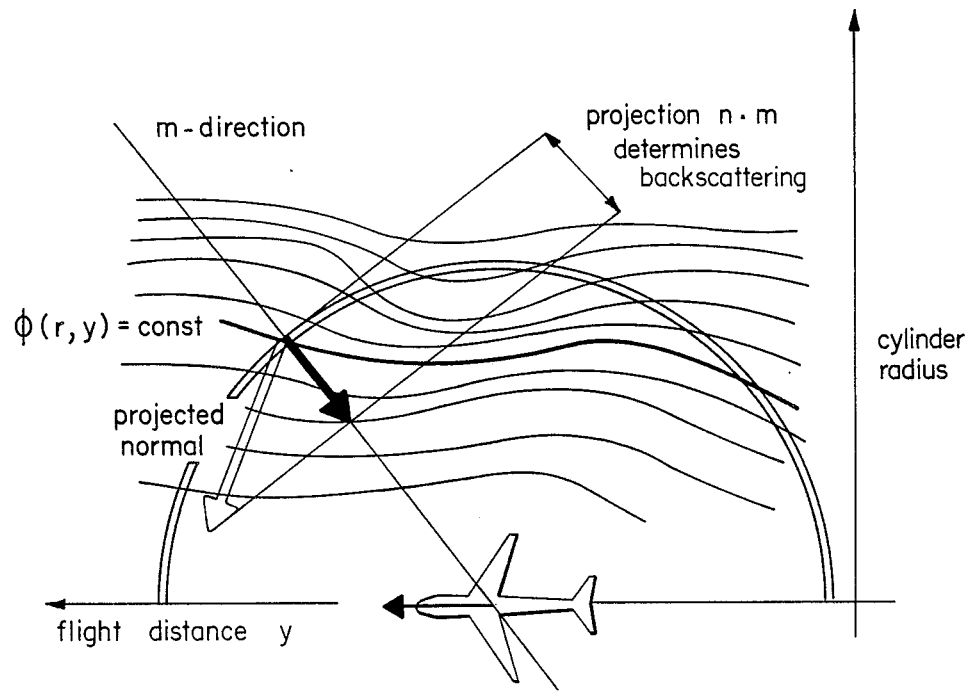

Step 2: When the ground undulations are sufficiently weak not to give rise to shadowing the ground surface may be represented by a single valued function $\phi(r,y)$ relating elevation angle $\phi$ and cylinder radius r for each azimuth position y. Projecting the ground normal on r,y-plane, the ground reflectivity density n·m may be graphically depicted according to the FIG. 7. Our assumption concerning the reflectivity kernel defines the local backscattering diagram of the ground. Due to the large variations in aspect angle encountered during the synthetic aperture of CARABAS, this cannot be assumed scalar as in ordinary SAR.

Figure 8:
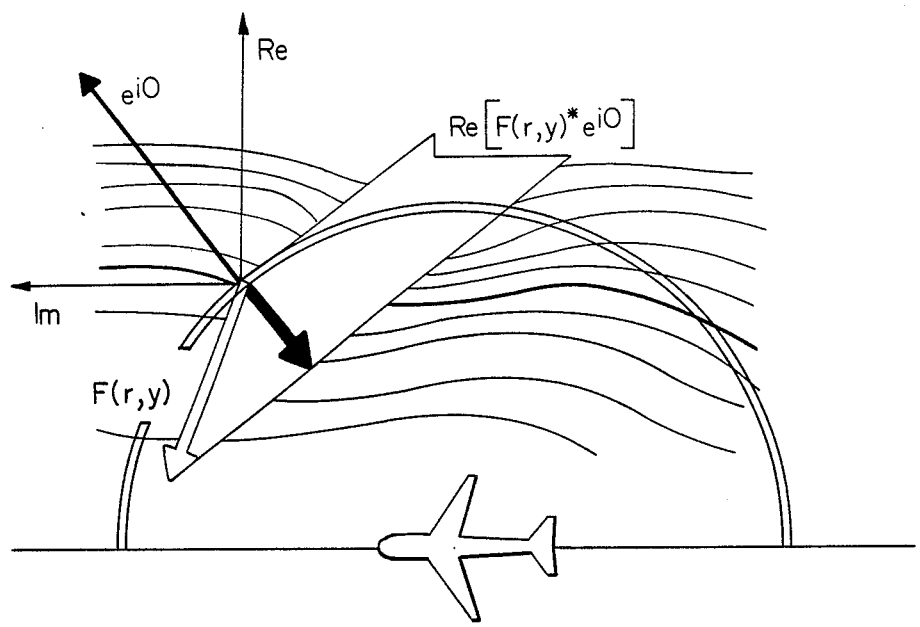

Step 3: The preceding Step 2 suggests an obvious wa of casting the problem into complex formalism, identifying the projected normal with a complex number F(r,y) as per FIG. 8. As it turns out, this number will appear as the complex reflectivity to be estimated from radar raw data. Conventional narrow band SAR fails—due to speckle—to estimate complex reflectivity correctly, in particular it will carry little or no information concerning its phase, which according to the figure is seen to define the topography locally. The complex expression $$\text{Re}[F^*(r,y)e^{i\theta}]=n\cdot m \quad (2)$$

is noted. Raw data is built up from averages of this kernel over circles of varying radii centered on the aircraft path as per the diagram. Hence, undulations on the ground will correspond to variations in this average, depending on the radius and azimuth position of the circle. The fundamental equation to be solved will restore uniquely the complex reflectivity vectors from knowledge of the full set of such averages.

Step 4: Influence of the antenna effects in the interferometric arrangement suggested in FIG. 9 can be approximately compensated for. The two antenna elements $D_1$, $D_2$ are dipoles, approximately isotropic respect to the elevation angle (they are aerodynamically stabilized by trailing cones $C_1,C_2$).

Compensation is provided for in the sense that $\Gamma$ determines a function R,t→G(R,t), independent of antenna or other radar system properties and pertaining to just one side of the aircraft. The function G is the circular average of f, obtained by integration over half a circle of any radius R and centered at the locus of the aircraft at any particular moment of time t $$G(R,t) \propto \int_{-\pi/2}^{\pi/2} F^*(R\cos\theta,t + R\sin\theta)e^{i\theta}d\theta, \quad (3)$$

The antenna arrangement must be symmetric with respect to right/left mirroring r,$\phi$,t→−r,$\phi$,t. Upon such mirroring $\Gamma(\nu,t)\to\Gamma(-\nu,t)^*$, while $\theta\to\pi-\theta$.

$$\psi(\nu,\theta)=\psi(-\nu,\pi-\theta)^* \quad (4)$$

In practice, cylinder axis offset for the dipoles must be sufficiently large that $\psi(\nu,\theta)$ and $\psi(\nu,\pi-\theta)$ differ significantly. Their non-equality will be crucial for the discrimination between right and left hand side reflections.

For the actual discrimination between right and left hand side reflections, perform a Fourier transform of (3), thus substituting time dependence (corresponding to different azimuth positions) for dependence on Doppler frequency $\mu$. In the cylinder-radius/azimuth position plane any particular angular sector $\Delta\theta$ corresponds to a certain Doppler shift. It follows that for each Doppler frequency $\mu$ the integral obtains its main contributions around the two aspect angles $$\theta_1 = \arcsin \frac{c\mu}{2v} \text{ and } \theta_2 = \pi - \arcsin \frac{c\mu}{2v}.$$

Hence, the antenna radiation pattern $\psi$ may be deconvolved for each transmitted frequency $v$ by representing the time response by its Doppler spectrum and dividing the different Doppler shifts by the antenna transmission characteristic for that particular angular sector. The method is approximate in the sense that the antenna diagram must change only slowly within the angular section $\Delta\theta$ corresponding to the 1st Fresnel zone on the ground.

Step 5: If G is well sampled in the sense described earlier, F may be obtained by regarding the formula as an integral equation for F. The method for solving this equation is similar to the Fourier-transform techniques often used in X-ray tomography. This approach to SAR was originally developed by the author in collaboration with L. E. Andersson (Hellsten H., Andersson L. E. [1987]: "AN INVERSE METHOD FOR THE PROCESSING OF SYNTHETIC APERTURE RADAR DATA"; Inverse Problems 3 (1987), 111–124; Andersson L. E. [1985]: "ON THE DETERMINATION OF A FUNCTION FROM SPHERICAL AVERAGES", SIAM J. Math. Anal. 19 (1985), 214–232 in these earlier efforts the assumption was made that the reflectivity kernel is independent of aspect angle $\theta$. The restriction to $\theta$-independence is however dissatisfying from the viewpoint of scattering physics and —even more important—certainly excludes direct application to the inverse scattering problem of reconstructing and ground topography according to Step 2. The procedure discussed presently, which forms the backbone in the data processing scheme of CARABAS, is a non-trivial modification of this previous work.

Fundamental to the solution of the integral equation is the fact that the mean amplitude of a 2-dimensional monochromatic plane wave, incident on a circle may be expressed by Bessel functions. Depending on whether the amplitude is a scalar, vector or tensor, Bessel functions of zero, first or higher orders will be involved. Presently we face a vector coupling situation, manifest by the presence of $C^{i\theta}$ in the scattering kernel. It is noted that the corresponding first order Bessel expression involves a factor linear in $v+i\mu$. This is absent for scalar coupling and of a higher order for tensor coupling.

Denote the 1-dimensional Fourier transform of a multidimensional function $F(\ldots,X,\ldots) \to F(\cdots \uparrow \cdots)(\ldots,v,\ldots)$. The Hankel transform $F(\ldots,X,\ldots) \to F(\ldots \uparrow,\cdots)(\ldots,v,\ldots)$ is a linear functional transform, similar to the Fourier transform, of functions of a positive argument, based on Bessel functions of a given order. However, while the Fourier transform may be adopted for expressing averages of any wave shape incident on a line (the so called Radon transform), the Hankel transform does the same for any wave shape incident on the circle.

Corresponding to the appearance of $\omega+i\mu$ in the circular average, the inverse formula will take the form of a first order differential equation, viz. be undetermined up to a certain class of boundary conditions. For scalar coupling no such extra conditions would have been required while for tensorial coupling still further boundary condition knowledge is required to be at hand.

Applying these considerations on the inversion of equation (3), the following spectrally defined solution is obtained $$(\partial_z F^* + \partial_z^* F)^{(\uparrow,\uparrow)}(v,\mu) \propto v \sqrt{v^2 + \mu^2} \, G^{(+,\uparrow)}(\sqrt{v^2 + \mu^2},\mu) \tag{6}$$

Here $\omega > 0$, while $\partial_z F^* + \partial_z^* F$ is real and thus defined by positive frequencies only (in real vector language it is seen to be the divergence of F).

Step 6: It is obvious that the expression $\partial_z F^* + \partial_z^* F$ alone cannot uniquely determine F. Indeed it defines a single real differential equation for the two real unknowns $F_{Re}$ and $F_{Im}$. However, it is seen that both $F_{Re}$ and $F_{Im}$ are defined by a single real function, viz. the ground angular height function $\phi(r,y)$.

From elementary vector analysis, it is known that the unit normals of the surface are obtained up to a sign according to $$\left.\begin{array}{l} F_{Re}(r,y) = m_r(r,y) = r\partial_r \phi(r,y) \\ F_{Im}(r,y) = m_y(r,y) = r\partial_y \phi(r,y) \end{array}\right\} \tag{7}$$

The formulas may be approximated further assuming local ground fluctuations to yield the dominant changes in the angular height function. The ground topography function will thereby be found solving the Poisson equation $$\partial_r^2(r\phi) + \partial_y^2(r\phi) = (\Gamma). \tag{8}$$

for a source density $(\Gamma)$ being a know functional of radar raw data $\Gamma$ by means of (6).

The solution of the Poisson equation, within the interior of a definite area $\Omega$ of the land surveyed, is readily available up to a solution of the homogeneous equation i.e. the Laplace equation. The additional function $\Phi$ accounts for influence of topography fluctuations outside the boundaries of $\Omega$. In fact, it is a well-known property of the Poisson equation that there is one and only one solution, which satisfies the equation in the interior of any given compact region $\Omega$, and assumes a prescribed set of values on its boundary. It follows, in particular, that there is precisely one ground topography within the domain, which corresponds to zero radar reflectivity $\Gamma = 0$, for every topography on its boundary. Though intuitively obvious that a flat piece of terrain not should cause any radar reflexes, the class of terrain shapes of zero reflectivity is obviously this much wider.

Step 7: It might be objected that many phenomena one would like to detect typically deviate strongly from the assumptions of Step 1 under which the togography has been reconstructed. For instance one would like to observe underground layers, variations in ground dielectricity, or man made objects incorporating both specular reflexes and shadows.

Detection and also classification of anomal features is feasible as long as these occur as isolated violations of the weak undulation hypothesis. Discriminating between surface and subsurface phenomena is a particular case which deserves discussion.

Figure 10:
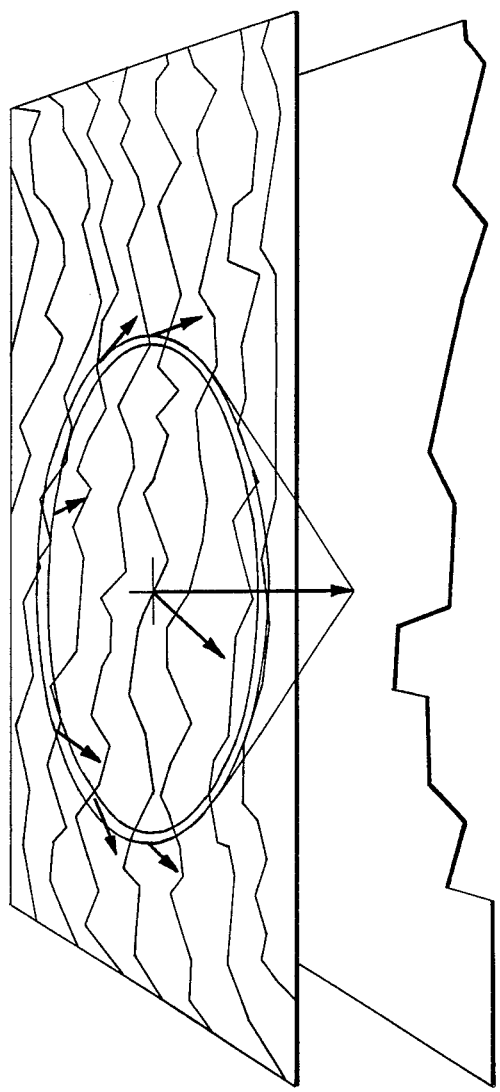
FIG. 10 shows schematically the underground reflexes.

In the processing routine outlined so far, reflexes from a common source beneath a given ground point become distributed along a circle segment concentric about the point and of a radius corresponding to the depth times the index of refraction. Because penetration may be many times the shortest wavelength, while resolution is in parity with the shortest wavelength, the underground reflex will affect several resolution cells (typical figures are given in FIG. 10). In other words the disturbance of underground reflexes will be defocused in the CARABAS image while the one-parameter correlation $$I\delta(r,y) = \int_{-\frac{\pi}{2}}^{\frac{\pi}{2}} F(r + \delta\cos\theta, y + \delta\sin\theta) F(r,y)^* d\theta \quad (9)$$

provides an image of such reflexes at an electromagnetic depth $\delta$. The argument reveals that the depth of field of the CARABAS image is quite small though the processing scheme presented earlier will "autofocus" to the surface consistent with wave propagation along rectilinear rays (in contrast to refracted rays), It also demonstrates that the ground surface topography estimate will not be unduly disturbed by the influence of underground reflexes. By comparison—for conventional SAR the underground reflex will affect just one single resolution cell, and thus be inseparable from the surface reflex.

I claim:

1. A method for radar mapping an area with a synthetic aperture radar, SAR, with suppression of speckle and including mapping structures concealed by dielectrical layers, comprising the steps of:
   generating in an equipment a radio frequency signal, which is distributed over a large relative bandwidth;
   emitting the generated radio frequency signal towards the area during a simultaneous movement of the equipment over the area;
   moving the equipment over the area under as constant conditions as possible with respect to height over the area, course and speed;
   receiving the reflection of the emitted signal in the equipment;
   calculating the reflectivity of the area by a tomographic method of inversion based upon the emitted signal, the received reflection and data concerning the movement of the equipment over the area, with the ground reflectivity defined as the scalar product between the direction of incidence of radiation hitting any particular point on the ground and the ground unit normal in that point; and
   calculating the 2-dimensional divergence of the ground normal vector field by combining Fourier and a first order Hankel transforms of radar data, followed by a coordinate change from polar coordinates to rectangular coordinates in the frequency domain, followed by an inverse 2-dimensional Fourier transform, said 2-dimensional divergence of the ground normal vector field enables a ground topography contour map to be obtained.

2. A method according to claim 1, wherein underground reflexes are separated from reflexes from the ground surface by the fact that the former do not propagate along straight lines but are refracted according to Snell's law passing through the ground surface, from which fact it follows that their scattered energy becomes distributed on a semicircle in the estimated surface topography map and whereupon further processing is done, correlating the topography map to such semicircles of varying radii and position, whereupon further maps will be obtained focusing the scattered energy to possible subsurface phenomena as a function of position (center position of semicircle) and depth (corresponding to the radius of the semicircle), whereby a structural classification of objects with respect to size and depth of the location below the surface of the area is derived and a high degree of uniqueness in the relation between topographic variations of the area and radar reflectivity is obtained.

3. A method according to claim 1, wherein the signal is emitted and the reflection received by the same antenna of two wideband antennas located a certain distance from each other perpendicularly to the direction of movement, said distance being chosen equal to a characteristic wave length of the signal spectrum of the signal and the antennas are activated alternately with a period of time which is less than or at most equal to the time for moving the equipment the length of an antenna, whereby two separate registrations of the area are made, which are different from each other by a translation perpendicular to the direction of movement and gives the possibility to separate reflections from the right and left side of the equipment.

4. A method according to claim 1, wherein the radio frequency signal is generated as a number of individual discrete radio frequencies or such frequencies arranged in groups, which frequencies are phaselocked to a highly stable oscillator, the reflection of the emitted radio frequency signal from the area after the reception is demodulated by these discrete frequencies or groups of frequencies and in that the modulations obtained by said demodulation are registered with correct phase in a digital mass storage, whereby a coherent generation and reception of signals with a large relative bandwidth are achieved and a conflict with possible radio communication is avoided by choosing the discrete frequency spectrum in a proper way.

5. A method according to claim 4, wherein the discrete radio frequencies are chosen as those exact harmonics to a fundamental frequency, which are closest to the values in a geometrical series $f_o(1+\Delta)^n$, where $f_o$ is the lowest frequency, $\Delta$ is a measure of the frequency step and n is an ordinal number, which can take values between two chosen numbers N1 and N2, where N1 preferably is about 1000 and N2 preferably about 2000, whereby an unwanted coupling between the signal and spurious signals (unintentionally generated and registered side frequencies or harmonics) is avoided, said spurious signals tending to be arithmetically related to the wanted frequency spectrum. said spurious signals tending to be arithmetically related to the wanted frequency spectrum.

6. A method for radar mapping an area with a synthetic aperture radar, SAR, with suppression of speckle and including mapping of structures concealed by dielectrical layers, comprising the steps of:
   generating a radio frequency signal distributed over a large relative bandwidth in an equipment;
   emitting the generated radio frequency signal towards the area during a simultaneous movement of the equipment over the area;
   moving the equipment over the area under as constant conditions as possible with respect to height over the area, course and speed;

receiving the reflection of the emitted signal in the equipment; and calculating the reflectivity of the area by a tomographic method of inversion based upon the emitted signal, the received reflection and data concerning the movement of the equipment over the area, whereby a structural classification of objects with respect to size and depth of the location below the surface of the area can be derived and a high degree of uniqueness in the relation between topographic variations of the area and radar reflectivity can be obtained, wherein the signal is emitted and the reflection received by the same antenna of two wideband antennas located a certain distance from each other perpendicularly to the direction of movement, said distance being chosen equal to a characteristic wave length of the signal spectrum of the signal and the antennas are activated alternately with a period of time which is less than or at most equal to the time for moving the equipment the length of an antenna, whereby two separate registrations of the area are made, which are different from each other by a translation perpendicular to the direction of movement and gives the possibility to separate reflections from the right and left side of the equipment.

7. A method for radar mapping an area with a synthetic aperture radar, SAR, with suppression of speckle and including mapping of structures concealed by dielectrical layers, comprising the steps of:

generating a radio frequency signal distributed over a large relative bandwidth in an equipment;

emitting the generated radio frequency signal towards the area during a simultaneous movement of the equipment over the area;

moving the equipment over the area under as constant conditions as possible with respect to height over the area, course and speed;

receiving the reflection of the emitted signal in the equipment; and calculating the reflectivity of the area by a tomographic method of inversion based upon the emitted signal, the received reflection and data concerning the movement of the equipment over the area, whereby a structural classification of objects with respect to size and depth of the location below the surface of the area can be derived and a high degree of uniqueness in the relation between topographic variations of the area and radar reflectivity can be obtained, wherein the radio frequency signal is generated as a number of individual discrete radio frequencies or such frequencies arranged in groups, which frequencies are phase-locked to a highly stable oscillator, the reflection of the emitted radio frequency signal from the area after the reception is demodulated by these discrete frequencies or groups of frequencies and in that the modulations obtained by said demodulation are registered with correct phase in a digital mass storage, whereby a coherent generation and reception of signals with a large relative bandwidth are achieved and conflict with possible radio communication is avoided by choosing the discrete frequency spectrum in a proper way.

8. A method according to claim 7, wherein the discrete radio frequencies are chosen as those exact harmonics to a fundamental frequency, which are closest to the values in a geometrical series $f_o(1+\Delta)^n$, where $f_o$ is the lowest frequency, $\Delta$ is a measure of the frequency step and n is an ordinal number, which can take values between two chosen numbers N1 and N2, where N1 preferably is about 1000 and N2 preferably about 2000, whereby an unwanted coupling between the signal and spurious signals (unintentionally generated and registered side frequencies or harmonics) is avoided, said spurious signals tending to be arithmetically related to the wanted frequency spectrum.

* * * * *